(12) United States Patent
Cao et al.

(10) Patent No.: US 10,149,110 B2
(45) Date of Patent: Dec. 4, 2018

(54) METHOD AND SYSTEM FOR TRACKING A PLURALITY OF COMMUNICATION DEVICES

(71) Applicant: MOTOROLA SOLUTIONS, INC., Chicago, IL (US)

(72) Inventors: Lan-Jian Cao, Sichuan (CN); Quan-Wen Du, Sichuan (CN); Shervin Sabripour, Plantation, FL (US); Ji-Feng Zheng, Sichuan (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/535,351

(22) PCT Filed: Jun. 6, 2016

(86) PCT No.: PCT/CN2016/084907
§ 371 (c)(1),
(2) Date: Jun. 12, 2017

(87) PCT Pub. No.: WO2017/210813
PCT Pub. Date: Dec. 14, 2017

(65) Prior Publication Data
US 2018/0295475 A1    Oct. 11, 2018

(51) Int. Cl.
*H04W 4/029* (2018.01)
*H04W 4/80* (2018.01)
(Continued)

(52) U.S. Cl.
CPC ............ *H04W 4/029* (2018.02); *H04W 4/80* (2018.02); *H04W 4/90* (2018.02);
(Continued)

(58) Field of Classification Search
CPC ..... H04N 21/21805; H04N 2201/3253; H04N 5/232; H04N 7/181; H04N 5/23296;
(Continued)

(56) References Cited

U.S. PATENT DOCUMENTS 6,593,848 B1    7/2003  Atkins et al.
7,095,901 B2    8/2006  Lee et al.
(Continued)

FOREIGN PATENT DOCUMENTS

| EP | 2879371 | 6/2015 | |
|---|---|---|---|
| WO | 2013003070 | 1/2013 | |
| WO | WO-2017210813 A1 * | 12/2017 | ............... H04N 7/18 |

OTHER PUBLICATIONS

PCT/CN2016/084907 International Search Report and Written Opinion of the International Searching Authority dated Feb. 22, 2017 (11 pages).
(Continued)

*Primary Examiner* — Matthew C Sams
(74) *Attorney, Agent, or Firm* — Michael Best & Friedrich LLP (57) ABSTRACT

Method and system for tracking a plurality of communication devices. One system includes a plurality of communication devices that each include a respective electronic processor, a respective camera, a respective location component, and a respective network interface. At least one of the plurality of communication devices is configured to receive location information from each of the other of the plurality of communication devices, generate a tracking map, and transmit the tracking map to each of the other of the plurality of communication devices. The tracking map assigns each of the plurality of communication devices only one of the other of the plurality of communication devices. Each of the plurality of communication devices is configured to control, with its respective electronic processor, its
(Continued)

respective camera based on the tracking map to include in its field of view its respectively assigned one of the other of the plurality of communication devices.

20 Claims, 7 Drawing Sheets (51) Int. Cl.
*H04W 4/90* (2018.01)
*H04N 5/232* (2006.01)

(52) U.S. Cl.
CPC .... *H04M 2250/10* (2013.01); *H04M 2250/52* (2013.01); *H04N 5/23206* (2013.01)

(58) Field of Classification Search
CPC ..... H04N 7/185; H04N 5/23206; H04W 4/02; H04W 4/023; H04L 67/18; G08B 13/1963; G08B 13/19689; G08B 13/19641; G08B 13/19621; G08B 13/19645; G06K 9/00771; G06T 7/292; G06T 7/70
See application file for complete search history.

(56) References Cited

U.S. PATENT DOCUMENTS

| | | | |
|---|---|---|---|
| 7,272,179 B2 | 9/2007 | Siemens et al. | |
| 7,720,257 B2 | 5/2010 | Morellas et al. | |
| 8,125,529 B2 | 2/2012 | Skoskiewicz et al. | |
| 8,237,771 B2 | 8/2012 | Kurtz et al. | |
| 8,274,544 B2 | 9/2012 | Kurtz et al. | |
| 8,681,232 B2 | 3/2014 | Fan et al. | |
| 8,683,054 B1* | 3/2014 | Karakotsios | H04N 5/23222 348/47 |
| 8,780,205 B2 | 7/2014 | Boutell et al. | |
| 8,831,407 B2 | 9/2014 | Meschter et al. | |
| 9,083,860 B2 | 7/2015 | Sabripour et al. | |
| 9,906,758 B2* | 2/2018 | Tofighbakhsh | G08B 25/016 |
| 9,928,594 B2* | 3/2018 | Hamer | H04N 5/247 |
| 2003/0151663 A1 | 8/2003 | Lorenzetti et al. | |
| 2004/0257208 A1 | 12/2004 | Huang et al. | |
| 2006/0279630 A1 | 12/2006 | Aggarwal et al. | |
| 2008/0122958 A1* | 5/2008 | Huseth | G08B 13/1963 348/262 |
| 2010/0311347 A1* | 12/2010 | Le Thierry D'Ennequin | H04N 1/32106 455/67.11 |
| 2011/0069173 A1* | 3/2011 | Hazzani | G08B 13/19608 348/159 |
| 2012/0127319 A1* | 5/2012 | Rao | H04N 5/23206 348/169 |
| 2012/0154599 A1 | 6/2012 | Huang | |
| 2014/0218287 A1 | 8/2014 | Pasquero et al. | |
| 2014/0280538 A1 | 9/2014 | Oswald | |
| 2015/0009327 A1* | 1/2015 | Love | H04N 7/181 348/148 |
| 2015/0156423 A1* | 6/2015 | Lundberg | H04N 5/23203 348/169 |
| 2015/0187120 A1 | 7/2015 | Overbeck | |
| 2016/0127695 A1* | 5/2016 | Zhang | H04N 5/23206 348/143 |

OTHER PUBLICATIONS http://fwww.skywaysecurity.com/auto-tracking-ptz-security-cameras/: Jun. 26, 2014, 2 pages.
http://www.boston.com/business/technology/innoeco/2012/02/fleye_testing_technology_at_ne.html:Feb. 24, 2012, 2 pages.
http:/fwww.swivl.com/:Jun. 26, 2014, 4 pages.
Automatic Camera Control Based on Subject Context; Geo-Pointing Module, Jun. 26, 2014, 1 page.
http:/fwww.vaddio.com/product/autorak_2.0_hd-20: Jun. 26, 2014, 6 pages.

* cited by examiner

FIG. 4D

METHOD AND SYSTEM FOR TRACKING A PLURALITY OF COMMUNICATION DEVICES

BACKGROUND OF THE INVENTION

When public safety personnel (for example, police officers, firefighters, and the like) are called to a location of an incident, other public safety personnel located remote to the incident (for example, at a police station, a fire station, a call center, and the like) may monitor the public safety personnel located at the incident. In many cases, such monitoring is performed by listening to voice communications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Instead of or in addition to monitoring voice communications, visual monitoring of public safety personal may be useful.

One embodiment provides a communication system including a plurality of communication devices. Each of the plurality of communication devices includes a respective electronic processor, a respective camera, a respective location component, and a respective network interface. At least one of the plurality of communication devices is configured to transmit, with its respective network interface, an instruction to each of the other of the plurality of communication devices to enable the respective camera of such other communications devices. The at least one of the plurality of communication devices is further configured to transmit, with its respective network interface, a request to each of the other of the plurality of communication devices to provide location information. The at least one of the plurality of communication devices is further configured to receive, with its respective network interface, the location information from each of the other of the plurality of communication devices. The at least one of the plurality of communication devices is further configured to generate, with its respective electronic processor, a tracking map based on the location information. The tracking map assigns each of the plurality of communication devices only one of the other of the plurality of communication devices. The at least one of the plurality of communication devices is further configured to transmit, with its respective network interface, the tracking map to each of the other of the plurality of communication devices. Each of the plurality of communication devices is configured to control, with its respective electronic processor, its respective camera based on the tracking map to include in its field of view its respectively assigned one of the other of the plurality of communication devices.

Another embodiment provides a method of tracking a plurality of communication devices. The method includes transmitting, with a network interface of one of the plurality of communication devices, an instruction to each of the other of the plurality of communication devices to enable the respective camera of such other communications devices. The method further includes transmitting, with the network interface of the one of plurality of communication devices, a request to each of the other of the plurality of communication devices to provide location information. The method further includes receiving, with the network interface of the one of plurality of communication devices, the location information from each of the other of the plurality of communication devices. The method further includes generating, with an electronic processor of the one of plurality of communication devices, a tracking map based on the location information. The tracking map assigns each of the plurality of communication devices only one of another of the plurality of communication devices. The method further includes transmitting, with the network interface of the one of plurality of communication devices, the tracking map to each of the other of the plurality of communication devices. The method further includes controlling, with a respective electronic processor of each of the plurality of communication devices, a respective camera of each of the plurality of communication devices based on the tracking map to include in its field of view its respectively assigned one of the another of the plurality of communication devices.

Figure 1:
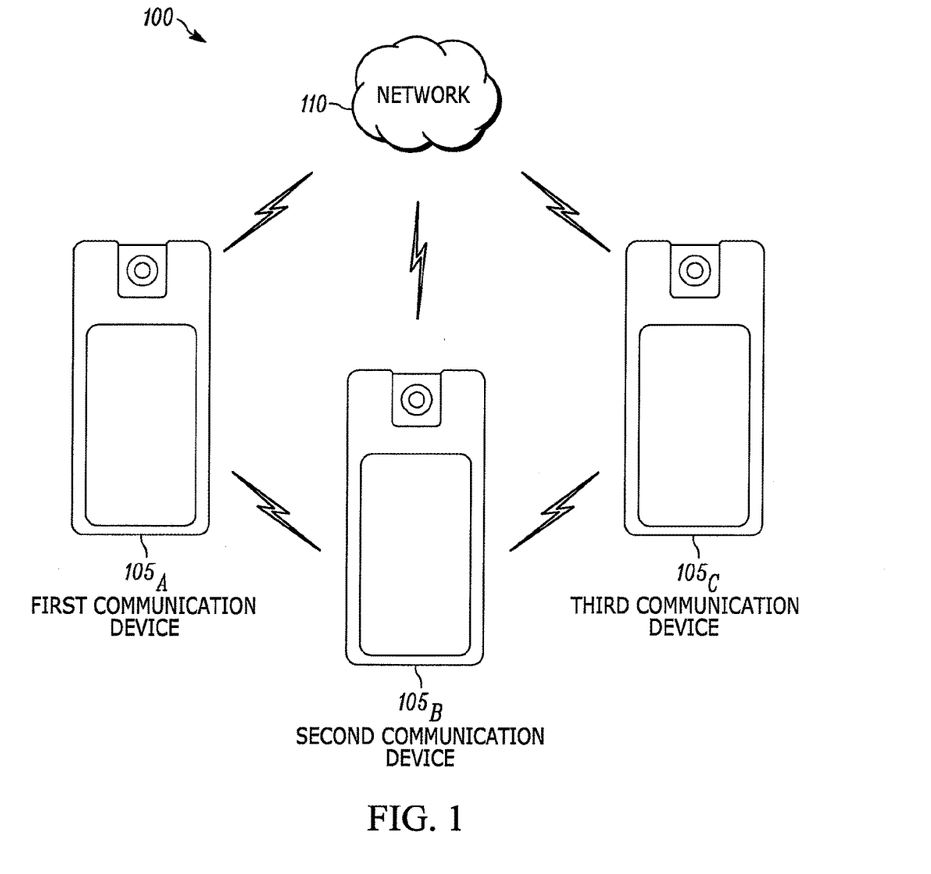
FIG. 1 is a diagram of a communication system according to one embodiment.

FIG. 1 is a block diagram of a communication system 100 according to one exemplary embodiment. The communication system 100 includes a plurality of communication devices. In the example illustrated in FIG. 1, a first communication device $105_A$, a second communication device $105_B$, and a third communication device $105_C$ are shown. In the following description, when explaining how a single communication device functions, a reference to communication device 105 is used. It is not necessary, however, that the communication devices $105_A$, $105_B$, and $105_C$ be identical. In addition, when discussing a group of communication devices, reference to a plurality of communication devices $105_A$ through $105_N$ is used. The subscript N indicates that the plurality of communication devices may include more or fewer devices than illustrated in FIG. 1.

The plurality of communication devices $105_A$ through $105_N$ communicate with each other over a network 110. The network 110 may be a wired or a wireless communication network. All or parts of the network 110 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 110 may also include future developed networks. In some embodiments, the network 110 may also include a combination of the networks mentioned previously herein. As illustrated in FIG. 1, in some embodiments, the plurality of communication devices $105_A$ through $105_N$ may communicate directly with each other using a communication channel or connection that is outside of the network 110. For example, the plurality of communication devices $105_A$ through $105_N$ may communicate directly with each other when they are within a predetermined distance from each other.

As illustrated in FIG. 1, the communication device 105 may be a handheld communication device, for example, a mobile telephone or other portable communication device, mobile radio, smart watch or other smart wearable, drone, or other communication device configured to communicate over the network 110. In some embodiments, the communication device 105 may be a handheld radio carried by a public safety officer or first responder, such as a police officer.

Figure 2:
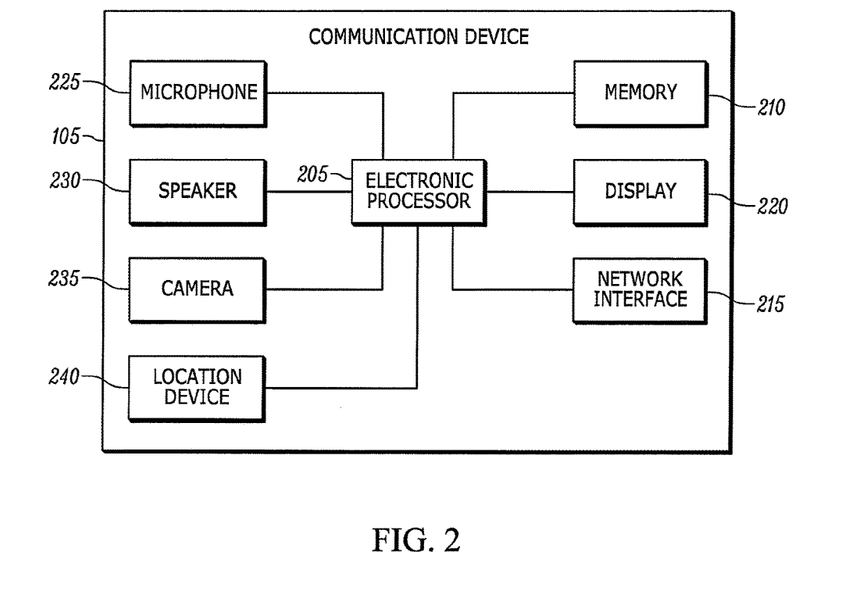
FIG. 2 is a diagram of a communication device included in the communication system of FIG. 1 according to one embodiment.

FIG. 2 is a block diagram of a communication device 105 of the communication system 100 according to one embodiment. The communication device 105 includes an electronic processor 205 (for example, a microprocessor or another electronic device), a memory 210, a network interface 215, a display 220, a microphone 225, a speaker 230, a camera 235 and a location component 240. In some embodiments, the communication device 105 may include fewer or additional components in configurations different from that illustrated in FIG. 2. For example, in some embodiments, the communication device 105 includes multiple cameras. Also, the communication device 105 may perform additional functionality than the functionality described below.

The memory 210 includes read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein.

The location component 240 is configured to determine the geographic coordinates of the location of the communication device 105. For example, in some embodiments, the location component 240 is a global positioning system receiver or a similar component that may determine the geographic coordinates of the location of the communication device 105.

The network interface 215 sends and receives data to and from the network 110. For example, the network interface 215 may include a transceiver for wirelessly communicating with the network 110. Alternatively or in addition, the network interface 215 may include a connector or port for receiving a wired connection to the network 110, such as an Ethernet cable. The electronic processor 205 receives electrical signals representing sound from the microphone 225 and may communicate information relating to the electrical signals over the network 110 through the network interface 215, such as for receipt by another communication device 105. Similarly, the electronic processor 205 may output data received from the network 110 through the network interface 215, such as from another communication device 105, through the speaker 230, the display 220, or a combination thereof. In some embodiments, the electronic processor 205 receives geographic coordinates provided by the location component 240 and may communicate the geographic coordinates over the network 110 through the network interface 215, such as for receipt by another communication device 105.

Additionally, the electronic processor 205 receives image or video data generated by the camera 235 and may communicate the image or video data over the network 110 through the network interface 215, such as for receipt by another communication device 105. The electronic processor 205 is also configured to control the camera 235. For example, the electronic processor 205 controls whether the camera 235 is able to capture image or video data (in other words, whether the camera 235 is enabled or disabled). In some embodiments, the electronic processor 205 controls at least one of a focal distance of the camera 235 and a direction of focus of the camera 235. For example, in some embodiments, the camera 235 is configured to rotate approximately three hundred sixty degrees. In such embodiments, the electronic processor 205 controls the rotation of the camera 235 (in other words, the direction of focus of the camera 235, which may be referred to as a field of view of the camera 235).

In some embodiments, the camera 235 may be physically separate from the communication device 105 and may be communicatively coupled to the electronic processor 205. For example, in some embodiments, the communication device 105 is a portable radio carried by a person such as public safety personnel and the camera 235 is an accessory mounted on an article worn by the person (for example, a jacket, a vest, a helmet, and the like). In another example, in some embodiments, the communication device 105 is a mobile radio mounted inside a public safety vehicle (for example, a police vehicle) and the camera 235 is mounted within or on the public safety vehicle. In embodiments where the camera 235 is physically separate from the communication device 105, the electronic processor 205 controls the camera 235 via a wired or wireless communication link. In such embodiments, the camera 235 is considered to be part of the communication device 105 even though the components are physically separated.

In some embodiments, the communication device 105 includes multiple cameras 235 that are controlled by the electronic processor 205. For example, the communication device 105 may include two opposed cameras (which in one example may be located one hundred eighty degrees from one another). In such embodiments, an article worn by a person such as public safety personnel (for example, a jacket, a vest, a helmet, and the like) may include a first camera that generally faces a first direction and a second camera that generally faces an opposite direction. The electronic processor 205 controls, via a wired or wireless communication link, the opposed cameras so as to enable one camera and disable the other camera. The electronic processor 205 may also control at least one of the focal distance and the direction of focus of the enabled camera.

As noted previously herein, the plurality of communication devices $105_A$ through $105_N$ may be associated with public safety personnel. When such public safety personnel have been called to an incident area (for example, the scene of a vehicle accident, the location of a threat to public safety, and the like) it may be helpful to monitor the incident area, and in particular, the public safety personnel, to provide details of the incident. Such details may be provided to additional public safety personnel located at a location remote from the incident area (for example, a command center).

Figure 3:
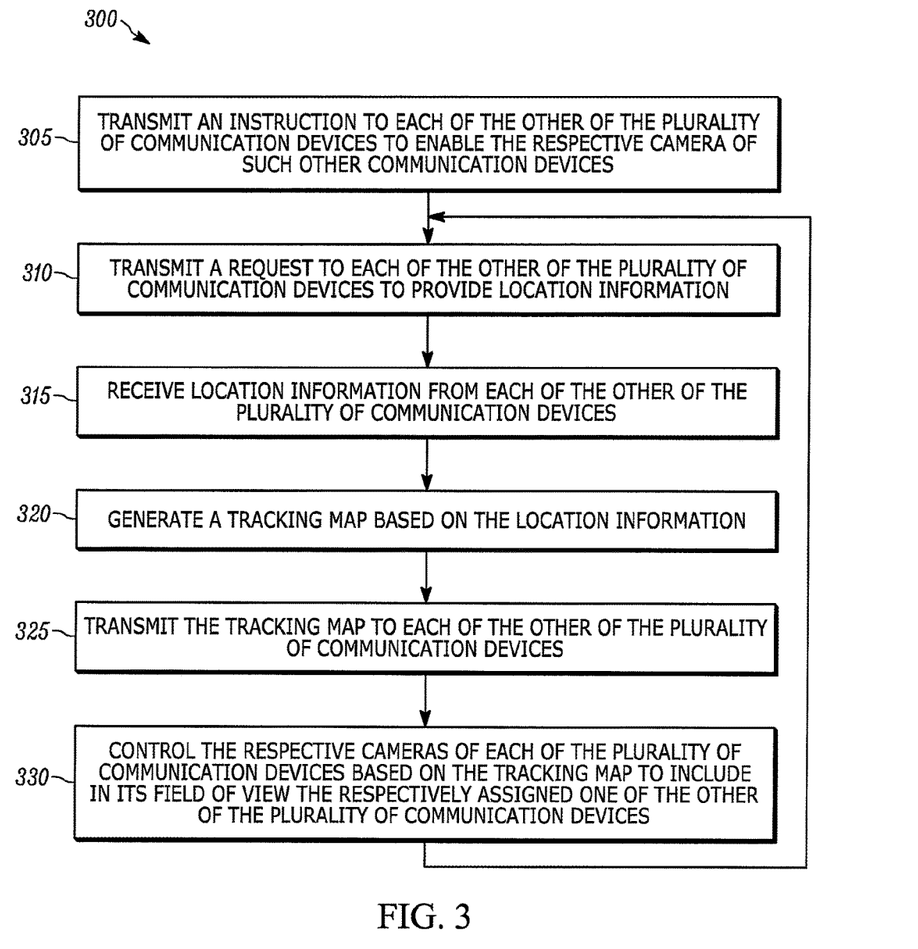
FIG. 3 is a flowchart of a method of tracking a plurality of communication devices performed by the communication devices of FIG. 1 according to one embodiment.

Accordingly, to monitor the incident area, and in particular public safety personnel within the incident area, a plurality of communication devices $105_A$ through $105_N$ may perform a method 300 illustrated in FIG. 3. The method 300 is used to control the respective cameras 235 of the plurality of communication devices $105_A$ through $105_N$ such that each camera 235 monitors one of the plurality of communication devices $105_A$ through $105_N$.

In the description of the method 300, when referring to one or each of the plurality of communication devices $105_A$ through $105_N$, the remaining communication devices in the plurality of communication devices $105_A$ through $105_N$ are referred to as the other of the plurality of communication devices $105_A$ through $105_N$. For example, one of the plurality of communication devices $105_A$ through $105_N$ may initiate the method 300 and may be referred to as a primary communication device 105. The remaining communication devices in the plurality of communication devices $105_A$ through $105_N$ (in other words, the communication devices that are not the primary communication device 105) may be referred to as the other of the plurality of communication devices $105_A$ through $105_N$.

In some embodiments, each of the plurality of communication devices $105_A$ through $105_N$ may be capable of initiating the method 300 described hereinafter. In other words, each of the plurality of communication devices $105_A$ through $105_N$ may be capable of being the primary communication device 105. In such embodiments, although each of the plurality of communication devices $105_A$ through $105_N$ is capable of being the primary communication device 105, only one communication device 105 serves as the primary communication device 105. In some embodiments, the primary communication device 105 initiates the method 300 when it receives an input from a user. For example, the primary communication device 105 may receive an input from the user that indicates that an emergency condition exists. In some embodiments, the primary communication device 105 may initiate the method 300 when it receives a request to initiate the method 300 through its network interface 215 from a remote location (for example, a command center). In some embodiments, the primary communication device 105 may initiate the method in additional manners. In some embodiments, the method 300 may be initiated and executed by a device other than one of the plurality of communication devices $105_A$ through $105_N$ (for example, a server, a communication device located at the command center, or a communication device located a location remote from the plurality of communication devices $105_A$ through $105_N$).

FIG. 3 illustrates the exemplary method 300 of controlling the plurality of communication devices $105_A$ through $105_N$. At block 305, one of the plurality of communication devices $105_A$ through $105_N$ (in other words, the primary communication device 105) transmits, with its network interface 215, an instruction to each of the other of the plurality of communication devices $105_A$ through $105_N$ to enable the respective camera 235 of such other communication devices. At block 310, the primary communication device 105 transmits, with its network interface 215, a request to each of the other of the plurality of communication devices $105_A$ through $105_N$ to provide location information (in other words, respective geographic coordinates of each of the other of the plurality of communication devices $105_A$ through $105_N$). For example, each of the other of the plurality of communication devices $105_A$ through $105_N$ may determine its respective geographic coordinates using its respective location component 240. In turn, each of the plurality of communication devices $105_A$ through $105_N$ may transmit the geographic coordinates over the network 110 through its respective network interface 215. At block 315, the primary communication device 105 receives, with its network interface 215, location information from each of the other of the plurality of communication devices $105_A$ through $105_N$.

At block 320, the primary communication device 105 generates, with its electronic processor 205, a tracking map based on the location information received from the other of the plurality of communication devices $105_A$ through $105_N$. In some embodiments, the tracking map assigns each of the plurality of communication devices $105_A$ through $105_N$ only one of the other of the plurality of communication devices $105_A$ through $105_N$. In such embodiments, the assigned communication device of each of the plurality of communication devices $105_A$ through $105_N$ may be referred to as a target communication device. In other words, each of the plurality of communication devices $105_A$ through $105_N$ is assigned only one target communication device, and each of the plurality of communication devices $105_A$ through $105_N$ is the target communication device of only one of the plurality of communication devices $105_A$ through $105_N$. In some embodiments, the tracking map includes the target communication device for each of the plurality of communication devices $105_A$ through $105_N$ as well as the corresponding geographic coordinates of each of the target communication devices. It should be noted that the primary communication device 105 includes itself and its geographic coordinates in the tracking map when generating the tracking map.

In some embodiments, the electronic processor 205 generates the tracking map by dividing the plurality of communication devices $105_A$ through $105_N$ into sub-groups based on their location. For example, the electronic processor 205 may generate a sub-group that includes communication devices $105_A$ through $105_N$ that are located within a predetermined sub-group distance from each other. In some embodiments, the electronic processor 205 generates the tracking map such that each communication device $105_A$ through $105_N$ within each sub-group has a target communication device that is also within the respective sub-group. In other words, the communication devices $105_A$ through $105_N$ within each sub-group monitor each other via a closed loop.

For example, when the first communication device $105_A$, the second communication device $105_B$, and the third communication device $105_C$ are located within the predetermined sub-group distance from each other, the electronic processor 205 determines that the communication devices $105_A$, $105_B$, and $105_C$ are in a sub-group. The electronic processor 205 then assigns each of the communication devices $105_A$, $105_B$, and $105_C$ a target communication device from the subgroup. For example, the electronic processor 205 may assign the first communication device $105_A$ to be the target communication device of the second communication device $105_B$. The electronic processor 205 may assign the second communication device $105_B$ to be the target communication device of the third communication device $105_C$. The electronic processor 205 may assign the third communication device $105_C$ to be the target communication device of the first communication device $105_A$. Accordingly, the electronic processor 205 creates a closed loop is between the communication devices $105_A$, $105_B$, and $105_C$ within the sub-group when generating the tracking map.

At block 325, the primary communication device 105 transmits, with its network interface 215, the tracking map to each of the plurality of communication devices $105_A$ through $105_N$. At block 330, each of the plurality of communication devices $105_A$ through $105_N$ controls, with its respective electronic processor 205, its respective camera 235 based on the tracking map to include in its respective field of view the respectively assigned one of the other of the plurality of communication devices $105_A$ through $105_N$ (in other words, the respectively assigned target communication devices).

In some embodiments, the electronic processor 205 of each communication device 105 controls the focal distance and direction of focus of its respective camera 235 to track its respective target communication device according to the tracking map. For example, each communication device 105 determines its own location using its location component 240. Additionally, each communication device 105 has received the location of its target communication device from the tracking map. Using these two locations, the electronic processor 205 controls at least one of the focal distance and the direction of focus of its respective camera 235 to include its respective target communication device in the field of view of its respective camera 235.

In some embodiments, each of the plurality of communication devices $105_A$ through $105_N$ transmits image or video data captured by its respective camera 235 over the network 110 (for example, a long-term evolution (LTE) network) through its respective network interface 215. For example, in some embodiments, each of the plurality of communication devices $105_A$ through $105_N$ transmits image or video data to a communication device 105 at a remote location such as a command center. In some embodiments, each of the plurality of communication devices $105_A$ through $105_N$ transmits image or video data in approximately real time. In some embodiments, the image or video data transmitted by each of the plurality of communication devices $105_A$ through $105_N$ may be used to assemble a combined view of the incident area.

After block 330, the method proceeds back to block 310 to continuously or periodically repeat blocks 310 through 330. Repetition of blocks 310 through 330 allows for the tracking map to be re-generated based on movement of one or more of the plurality of communication devices $105_A$ through $105_N$ as discussed hereinafter. Accordingly, the method 300 provides for monitoring and tracking of each of a plurality of communication devices $105_A$ through $105_N$ by a single one of another of the plurality of communication devices $105_A$ through $105_N$.

Figure 4A:
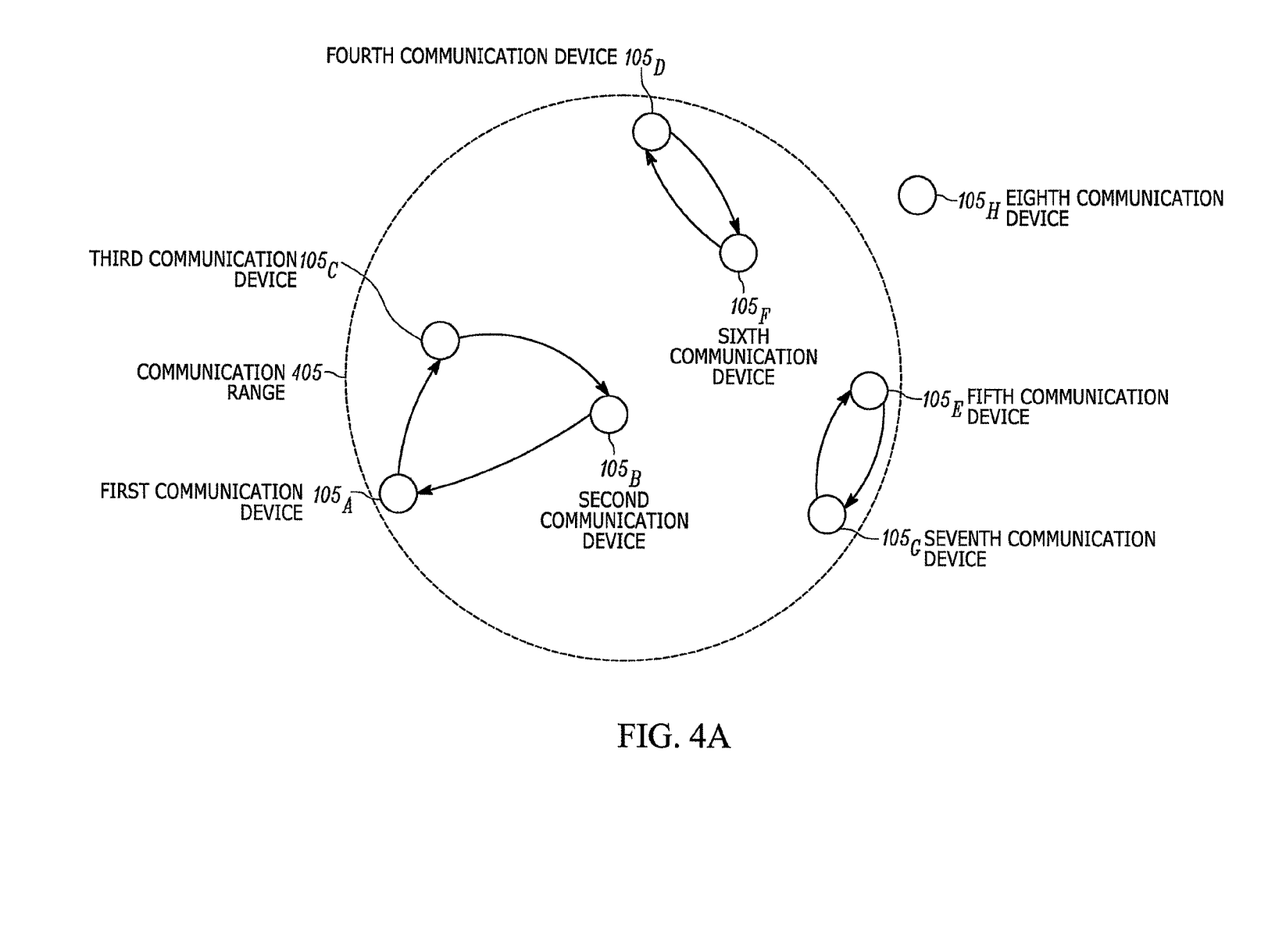
FIGS. 4A through 4D illustrate diagrams of exemplary tracking maps for tracking the plurality of communication devices.

For example, FIG. 4A illustrates a schematic diagram of an exemplary tracking map for a plurality of communication devices $105_A$ through $105_G$ that includes seven communication devices (in other words, the plurality of communication devices $105_A$ through $105_G$ includes an odd number of three or more communication devices). FIG. 4A also includes an eighth communication device $105_H$. The plurality of communication devices $105_A$ through $105_G$ illustrated in FIG. 4A is merely exemplary. As noted previously herein, the plurality of communication devices may include more or fewer communication devices.

In the example illustrated in FIG. 4A, the second communication device $105_B$ is the primary communication device and generates a tracking map as shown schematically in FIG. 4A. In FIG. 4A, the arrows indicate the target communication device of each of the plurality of communication devices $105_A$ through $105_G$. For example, the first communication device $105_A$ is the target communication device of the second communication device $105_B$. Similarly, the fourth communication device $105_D$ is the target communication device of the sixth communication device $105_F$. As shown in FIG. 4A and as explained previously herein, each of the plurality of communication devices $105_A$ through $105_G$ is the target communication device of only of one of another of the plurality of communication devices $105_A$ through $105_G$. Additionally, each of the plurality of communication devices $105_A$ through $105_G$ is assigned only one target communication device.

FIG. 4A also illustrates the sub-groups determined by the electronic processor 205 when generating the tracking map. As shown in FIG. 4A, the communication devices $105_A$, $105_B$, and $105_C$ have been grouped into one sub-group. Similarly, the communication devices $105_D$ and $105_F$ have been grouped into another sub-group. The communication devices $105_E$ and $105_G$ have been grouped into yet another sub-group.

FIG. 4A also illustrates a communication range 405 that defines which communication devices are included in the plurality of communication devices $105_A$ through $105_N$ used to generate the tracking map. In some embodiments, the communication devices that are included in the plurality of communication devices $105_A$ through $105_N$ are determined based on whether they are within communication range 405 of the primary communication device 105 (for example, the second communication device $105_B$ in the exemplary situation illustrated in FIG. 4A). For example, the primary communication device 105 may broadcast a request for location information through its network interface 215 over a Personal Area Network (PAN). The communication devices whose location information is received by the primary communication device 105 in response to the request for location information are included in the plurality of communication devices $105_A$ through $105_N$. On the other hand, the communication devices whose location information is not received by the primary communication device 105 are not included in the plurality of communication devices $105_A$ through $105_N$. In other words, the communication devices that are out of communication range 405 with the primary communication device 105 (for example, communication devices that are unable to receive the request from the primary communication device 105 or communication devices whose responses to the request are not received by the primary communication device 105) are not included in the plurality of communication devices $105_A$ through $105_N$.

As shown in FIG. 4A, the eighth communication device $105_H$ is located outside of the exemplary communication range 405. Accordingly, the eighth communication device $105_H$ is not included in the tracking map and is not monitored by any of the plurality of communication devices $105_A$ through $105_G$.

Figure 4B:
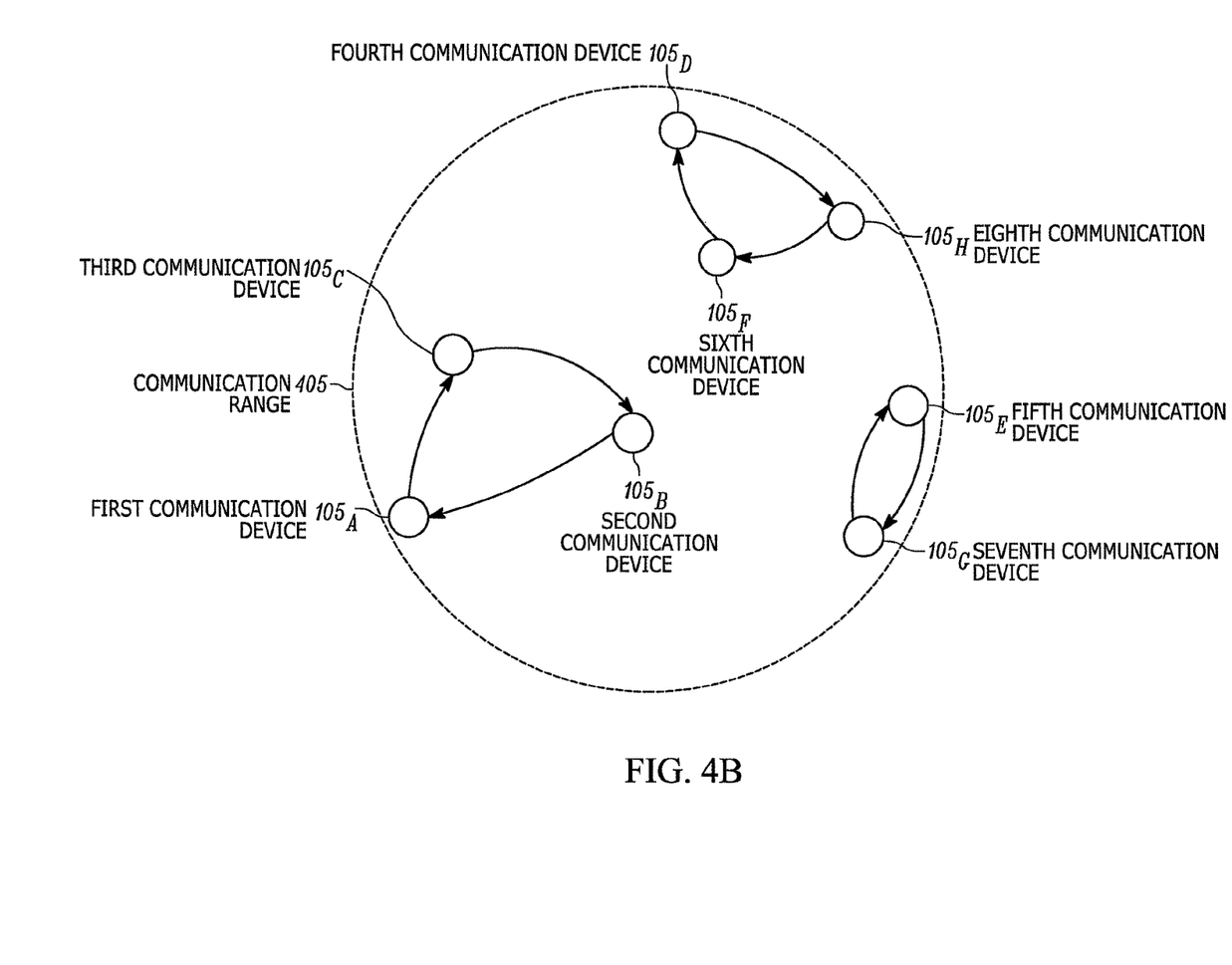

FIG. 4B illustrates a schematic diagram of an exemplary tracking map for a plurality of communication devices $105_A$ through $105_H$ that includes eight communication devices. As shown in FIG. 4B, the eighth communication device $105_H$ has now moved to be located within the communication range 405. Accordingly, when repeating the method 300, the electronic processor 205 of the second communication device $105_B$ re-generates the tracking map to include the eighth communication device $105_H$ as shown in FIG. 4B. In some embodiments, the electronic processor 205 re-creates sub-groups based on the location information received from the plurality of communication devices $105_A$ through $105_H$.

In addition to re-generating the tracking map when a communication device newly enters within the communication range 405, the electronic processor 205 may also re-generate the tracking map when a communication device within the communication range 405 moves to be located outside the communication range 405. In some embodiments, the electronic processor 205 may also re-generate the tracking map upon receiving an instruction from a remote location (for example, a command center).

For example, when public safety personnel at the command center notice that a communication device is no longer viewable (for example, a wall is obstructing a view of the communication device), an instruction may be transmitted over the network 110 to the primary communication device 105 to re-generate the tracking map. Such re-generation of the tracking map may allow the unviewable communication device to become the target communication device of a different communication device that has an unobstructed view of the previously unviewable communication device. Alternatively, the instruction from the command center may request that the primary communication device 105 remove the unviewable communication device from the tracking map as if it were outside of the communication range 405. The electronic processor 205 may then re-generate the tracking map with the remaining communication devices in the plurality of communication devices $105_A$ through $105_N$. In such embodiments, a later instruction from the command center may request that the primary communication device 105 re-generate the tracking map with the unviewable communication device included when, for example, public safety personnel observe that the unviewable communication device is no longer unviewable (for example, the unviewable communication device is observed in the background of the image or video received from another of the plurality of communication devices $105_A$ through $105_N$).

Figure 4C:
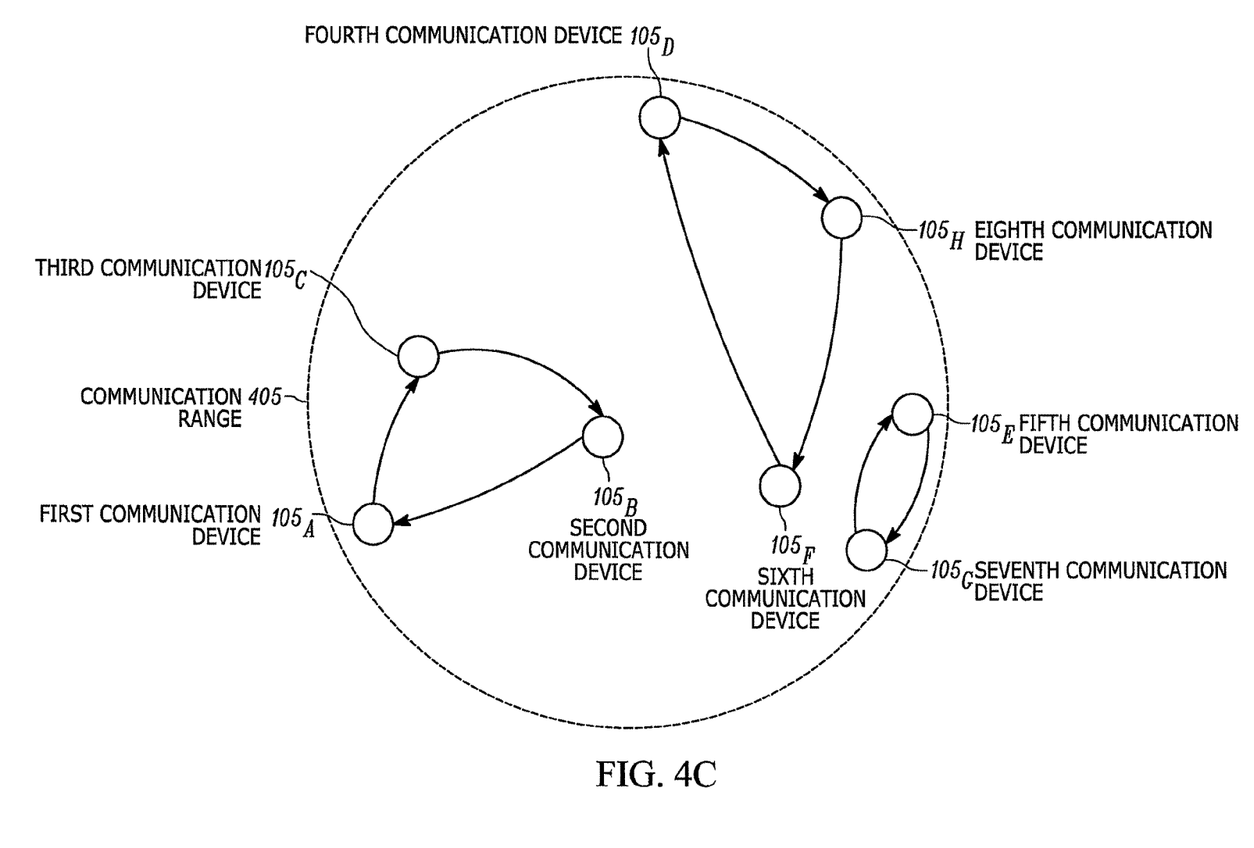
Figure 4D:
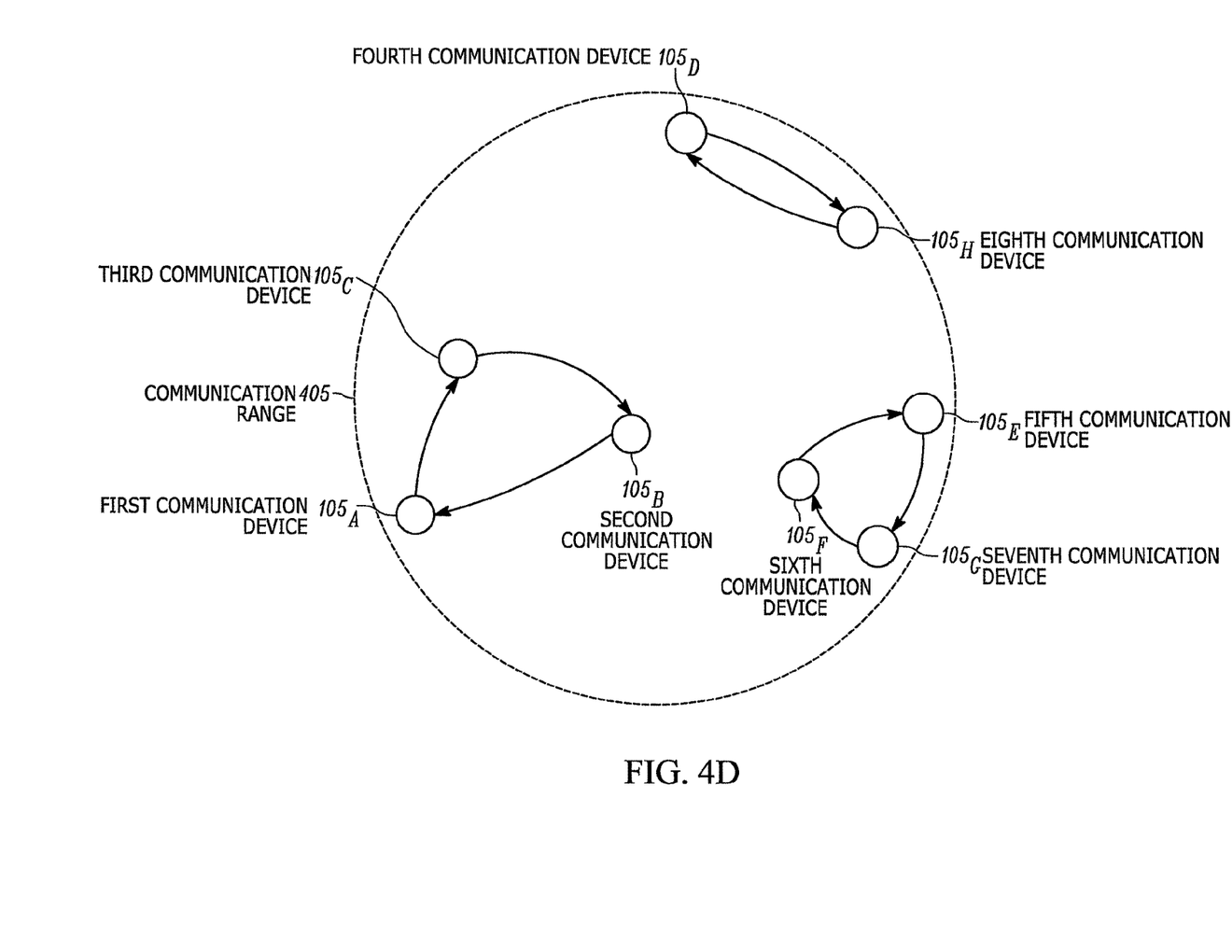

As noted previously herein, in some embodiments, the electronic processor 205 of the primary communication device 105 creates sub-groups of the plurality of communication devices $105_A$ through $105_N$ based on a predetermined sub-group distance. When repeating the method 300, the electronic processor 205 may re-generate the tracking map when the distance between two or more communication devices within a sub-group exceeds the predetermined sub-group distance. For example, as shown in FIG. 4C, the sixth communication device $105_F$ has moved (with respect to FIG. 4B) such that the distance between itself and the communication devices $105_D$ and $105_H$ of its sub-group exceeds the predetermined sub-group distance. Accordingly, the electronic processor 205 of the primary communication device 105 re-generates the tracking map as shown schematically in FIG. 4D. As shown in FIG. 4D, the sixth communication device $105_F$ is in a sub-group with communication devices $105_E$ and $105_G$, all of which are within the predetermined sub-group distance from each other.

When the electronic processor 205 of the primary communication device 105 re-generates the tracking map (for example, at block 320), the remaining blocks of the method 300 (in other words, blocks 325 and 330) are also executed. Accordingly, the respective cameras 235 of each of the plurality of communication devices $105_A$ through $105_N$ may be controlled by their respective electronic processors 205 to monitor and track their respective target communication device.

In some embodiments, the electronic processor 205 of the primary communication device 105 selects one of the other of the plurality of communication devices $105_A$ through $105_N$ to be a back-up primary communication device. In such embodiments, the back-up primary communication device may act as the primary communication device 105 in case of failure by the primary communication device 105 (for example, when the primary communication device 105 is no longer operational or is no longer located centrally to the plurality of communication devices $105_A$ through $105_N$). In some embodiments, in the event of a failure of the primary communication device 105, one of the plurality of communication devices $105_A$ through $105_N$ located near the center of the plurality of communication devices $105_A$ through $105_N$ may be chosen as the back-up primary communication device. In some embodiments, in the event of a failure of the primary communication device 105, an instruction from the command center may select one of the plurality of communication devices $105_A$ through $105_N$ as the primary communication device 105 or as the back-up primary communication device.

In some embodiments, the method 300 may be terminated (for example, the primary communication device 105 no longer generates the tracking map and each of the plurality of communication devices $105_A$ through $105_N$ no longer monitors its respective target communication device) by the primary communication device 105. For example, the primary communication device 105 may receive an input from a user that indicates the method 300 should be terminated. In some embodiments, an instruction from the command center received by the primary communication device 105 or each of the plurality of communication devices $105_A$ through $105_N$ may terminate the method 300.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication system comprising:
a plurality of communication devices, each of the plurality of communication devices including a respective electronic processor, a respective camera, a respective location component, and a respective network interface;
at least one of the plurality of communication devices configured to
transmit, with its respective network interface, an instruction to each of the other of the plurality of communication devices to enable the respective camera of such other communications devices,
transmit, with its respective network interface, a request to each of the other of the plurality of communication devices to provide location information,
receive, with its respective network interface, the location information from each of the other of the plurality of communication devices,
generate, with its respective electronic processor, a tracking map based on the location information, wherein the tracking map assigns each of the plurality of communication devices only one of the other of the plurality of communication devices, and
transmit, with its respective network interface, the tracking map to each of the other of the plurality of communication devices; and
each of the plurality of communication devices configured to control, with its respective electronic processor, its respective camera based on the tracking map to include in its field of view its respectively assigned one of the other of the plurality of communication devices.

2. The communication system of claim 1, wherein the at least one of the plurality of communication devices is configured to generate, with its respective electronic processor, the tracking map at least partially by dividing the plurality of communication devices into sub-groups based on the location information.

3. The communication system of claim 1, wherein the tracking map includes geographic coordinates of each of the plurality of communication devices and wherein each of the plurality of communication devices is configured to control, with its respective electronic processor, its respective camera based on the geographic coordinates of its respectively assigned one of the other of the plurality of communication devices.

4. The communication system of claim 1, wherein each of the plurality of communication devices is configured to control, with its electronic processor, at least one from the group consisting of a focal distance and a direction of focus of its respective camera.

5. The communication system of claim 1, wherein each of the plurality of communication devices is configured to transmit, with its respective network interface, image or video data captured by its respective camera via a network.

6. The communication system of claim 5, wherein each of the plurality of communication devices is configured to communicate with the other of the plurality of communication devices via a personal area network.

7. The communication system of claim 1, wherein at least one of the respective cameras is mounted on at least one of the group consisting of a vehicle, a drone, and an article worn by a person.

8. The communication system of claim 1, wherein at least one of the respective cameras is configured to rotate approximately three hundred and sixty degrees.

9. The communication system of claim 1, wherein at least one of the plurality of communication devices includes a second camera such that its respective camera and the second camera face in substantially opposite directions.

10. The communication system of claim 1, wherein the plurality of communication devices includes an odd number of three or more communication devices.

11. A method of tracking a plurality of communication devices, the method comprising:
transmitting, with a network interface of one of the plurality of communication devices, an instruction to each of the other of the plurality of communication devices to enable the respective camera of such other communications devices, transmitting, with the network interface of the one of plurality of communication devices, a request to each of the other of the plurality of communication devices to provide location information, receiving, with the network interface of the one of plurality of communication devices, the location information from each of the other of the plurality of communication devices, generating, with an electronic processor of the one of plurality of communication devices, a tracking map based on the location information, the tracking map assigning each of the plurality of communication devices only one of another of the plurality of communication devices, and transmitting, with the network interface of the one of plurality of communication devices, the tracking map to each of the other of the plurality of communication devices; and controlling, with a respective electronic processor of each of the plurality of communication devices, a respective camera of each of the plurality of communication devices based on the tracking map to include in its field of view its respectively assigned one of the another of the plurality of communication devices.

12. The method of claim 11, wherein generating, with the electronic processor of the one of plurality of communication devices, the tracking map includes generating, with the electronic processor of the one of plurality of communication devices, the tracking map at least partially by dividing the plurality of communication devices into sub-groups based on the location information.

13. The method of claim 11,
wherein generating, with the electronic processor of the one of plurality of communication devices, the tracking map includes generating, with the electronic processor of the one of plurality of communication devices, the tracking map, the tracking map including geographic coordinates of each of the plurality of communication devices; and
wherein controlling, with the respective electronic processor of each of the plurality of communication devices, the respective camera of each of the plurality of communication devices includes controlling, with the respective electronic processor of each of the plurality of communication devices, the respective camera of each of the plurality of communication devices based on the geographic coordinates of its respectively assigned one of the other of the plurality of communication devices.

14. The method of claim 11, wherein controlling, with the respective electronic processor of each of the plurality of communication devices, the respective camera of each of the plurality of communication devices includes controlling, with the respective electronic processor of each of the plurality of communication devices, at least one from the group consisting of a focal distance and a direction of focus of the respective camera of each of the plurality of communication devices.

15. The method of claim 11, further comprising transmitting, with the respective network interface of each of the plurality of communication devices, image or video data captured by the respective camera of each of the plurality of communication devices via a network.

16. The method of claim 15,
wherein transmitting the request, with the network interface of the one of plurality of communication devices, the request to each of the other of the plurality of communication devices to provide the location information includes transmitting, with the network interface of the one of plurality of communication devices, the request to each of the other of the plurality of communication devices to provide the location information via a personal area network;
wherein receiving, with the network interface of the one of plurality of communication devices, the location information from each of the other of the plurality of communication devices includes receiving, with the network interface of the one of plurality of communication devices, the location information from each of the other of the plurality of communication devices via the personal area network; and
wherein transmitting, with the network interface of the one of plurality of communication devices, the tracking map to each of the other of the plurality of communication devices includes transmitting, with the network interface of the one of plurality of communication devices, the tracking map to each of the other of the plurality of communication devices via the personal area network.

17. The method of claim 11, wherein controlling, with the respective electronic processor of each of the plurality of communication devices, the respective camera of each of the plurality of communication devices includes controlling, with the respective electronic processor of each of the plurality of communication devices, the respective camera of each of the plurality of communication devices, at least one of the respective cameras being mounted on at least one of the group consisting of a vehicle, a drone, and an article worn by a person.

18. The method of claim 11, wherein controlling, with the respective electronic processor of each of the plurality of communication devices, the respective camera of each of the plurality of communication devices includes controlling, with the respective electronic processor of each of the plurality of communication devices, the respective camera of each of the plurality of communication devices, at least one of the respective cameras being configured to rotate approximately three hundred and sixty degrees.

19. The method of claim 11, wherein controlling, with the respective electronic processor of each of the plurality of communication devices, the respective camera of each of the plurality of communication devices includes controlling, with the respective electronic processor of each of the plurality of communication devices, the respective camera of each of the plurality of communication devices, at least one of the plurality of communication devices including a second camera such that its respective camera and the second camera face in substantially opposite directions.

20. The method of claim 11, wherein generating, with the electronic processor of the one of plurality of communication devices, the tracking map based on the location information, the tracking map assigning each of the plurality of communication devices only one of another of the plurality of communication devices includes generating, with the electronic processor of the one of plurality, of communication devices, the tracking map based on the location information, the tracking map assigning each of the plurality of communication devices only one of another of the plurality of communication devices and the plurality of communication devices including an odd number of three or more communication devices.

* * * * *